June 2, 1942.　　　W. T. FOREMAN　　　2,284,648
ELECTRIC WELDING APPARATUS
Filed April 7, 1941
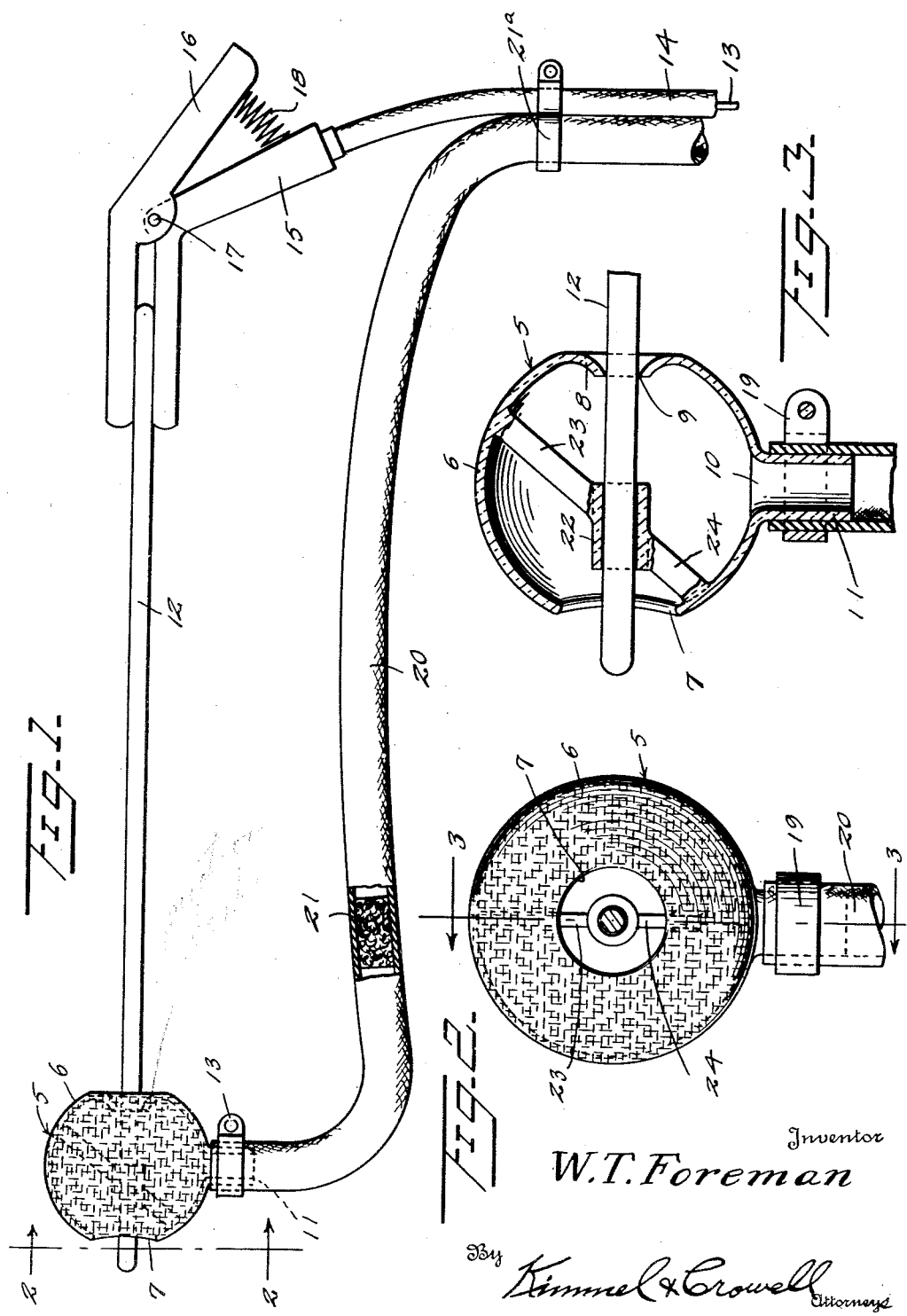
Inventor
W. T. Foreman
By Kimmel & Crowell
Attorneys

UNITED STATES PATENT OFFICE 2,284,648

ELECTRIC WELDING APPARATUS

Walter T. Foreman, Petersburg, Va.

Application April 7, 1941, Serial No. 387,296

4 Claims. (Cl. 219—8)

This invention relates to electric welding apparatus.

An object of this invention is to provide a combined suction hood and welding rod or stick shield which is adapted to guide the rod and simultaneously remove any spark, smoke or the like emanating about the work and the working end of the rod.

Another object of this invention is to provide a globular shield and guide for a welding rod which is formed of tinted glass or the like so that the shield may completely enclose the working end of the rod and be disposed in contact with the work and thus permit the worker to perform the welding operation without using colored glasses.

A further object of this invention is to provide in combination with a shield of this kind a suction pipe or hose connected with the shield and a filtering means in the pipe or hose for removing the sparks and other material drawn into the shield.

A still further object of this invention is to provide a substantially transparent shield which will not impair the vision of the worker, and at the same time will collect flying sparks, metal particles and the like.

Further objects of the invention are to provide, in a manner as hereinafter set forth, an electric welding apparatus which is comparatively simple in its construction and arrangement, strong, durable, compact, readily assembled, convenient in its use, thoroughly efficient for the purpose intended thereby and comparatively inexpensive to manufacture.

Embodying the objects aforesaid and others which may hereinafter appear, the invention consists of the novel construction, combination and arrangement of parts as will be more specifically referred to and illustrated in the accompanying drawing, wherein is shown an embodiment of the invention, but it is to be understood that changes, variations and modifications may be resorted to which fall within the scope of the invention as claimed.

In the drawing:

Figure 1 is a side elevation, partly in lengthwise section of a welding apparatus in accordance with this invention, Figure 2 is a section on line 2—2, broken away, looking in the direction of the arrows, and Figure 3 is a section on line 3—3, Figure 2.

The apparatus, in accordance with this invention includes a globular element 5 formed of tinted glass whereby it will be substantially transparent. The element 5 alleviates the necessity for the employment by the operator of dark glasses. The element 5 is to be formed of heat resistant tinted glass of any suitable shade and it is to be shaped to fit the type of work for which it is to be used. The element 5 comprises a hollow body portion 6 of the desired shape, preferably globular and it is formed at one side with a cutout providing an opening 7 and at its opposite side with an inturned tapered portion 8 of annular cross section, which provides an opening 9 of less diameter than and disposed coaxially with the opening 7. The portion 8 constitutes a guide for a purpose to be referred to. The bottom of the body portion 6 centrally thereof has an opening or outlet 10 and depending from and integral with body 6 is a tubular shank 11, which has its inner face merge into the wall of the opening 10.

A weld stick is indicated at 12, which is shown as extended through the element 5 and is slidable relative to the latter. The stick 12 is supported and guided by the part 8 and is arranged centrally with respect to the opening 7. The element 5 is freely slidable on the stick 12.

A power line is indicated at 13 and is enclosed by insulation 14. Connected to the line 13 is a clamp section 15, which coacts with a spring controlled clamp section 16 pivotally connected, as at 17, to the section 15. The controlling spring for the section 16 is indicated at 18. The sections 15, 16 clamp the stick 12 to the power line. The sections 15, 16 are insulated, but the section 15 is so formed whereby the stick 12 will be electrically connected to the power line 13.

Detachably connected to and about the shank by the holdfast means 19 is one terminal portion of a flexible hose 20, which leads to a suction manifold not shown. Arranged in the hose 20 is a filtering means 21 of glass wool constituting a porous collector correlating with the hose 20 for a purpose referred to. The said means 21 is located between the suction manifold and the said terminal portion of said hose. The hose 20 is clamped to the power line 13, as at 21ª.

Suspended in the body portion 6 of the element 5 and aligned with the opening 9 is a tubular support 22 for the stick 12. The support 22 is carried by oppositely disposed braces 24, which are integral with the inner face of the body portion 6 of the element 5.

The hose 20 and filtering means 21 provide for removing the sparks and other material drawn into the element 5 and with said means 21 acting to arrest the metallic particles so as to prevent 21 being damaged or torn.

The element 5 constitutes a shield for the operator or worker when the apparatus is active and does not impair the vision of the worker. The element 5 will confine flying sparks, metal particles, smoke and the like, and as its interior communicates with the suction means, the latter will provide for the drawing off from within said element sparks, other material and smoke.

What I claim is:

1. A shield for a welding stick comprising a hollow tinted substantially transparent globular body, an inwardly projecting substantially frusto-conical stick guide integral with said body, said body having an opening spaced from and coaxial with said guide, a supporting guide sleeve for the stick suspended within said body, and a coupling stem extended from said body.

2. A shield for a welding stick comprising a hollow tinted substantially transparent body having an inturned hollow frusto-conical part at one side thereof constituting a guide for the stick and having its opposite side formed with an opening of greater diameter than the inner end of the guide and disposed coaxially with respect to the guide, said body further including a hollow stem at its bottom and communicating with the interior thereof, and a supporting sleeve for the stick suspended within said body and arranged coaxially with said opening and guide.

3. In a shield for a welding stick comprising a hollow tinted substantially transparent body provided with a hollow stem communicating with the interior of the body adapted to be connected to a suction means, said body having one side formed with a frusto-conical inwardly extended guide of annular cross section for the welding stick, a sleeve for supporting the stick disposed coaxially with said guide, a diagonally disposed support for said sleeve and an opening in its opposite side for the passage of the stick.

4. In a welding apparatus a shield for slidably mounting on the weld stick, said shield comprising a hollow body having a hollow stem for connecting it to a suction means, said body being provided at one side with a guide for the stick and at its opposite side with an opening for the passage of the stick, and said body including therein a suspended supporting sleeve for the stick, said sleeve opening and guide being coaxially arranged.

WALTER T. FOREMAN.